United States Patent [19]
Nelson

[11] Patent Number: 5,339,187
[45] Date of Patent: Aug. 16, 1994

[54] WIDE DYNAMIC RANGE HIGH FREQUENCY SIGNAL TRANSMISSION UTILIZING A LOGARITHMIC AMPLIFIER

[75] Inventor: George F. Nelson, Coon Rapids, Minn.

[73] Assignee: Unisys Corporation, Blue Bell, Pa.

[21] Appl. No.: 944,620

[22] Filed: Sep. 14, 1992

[51] Int. Cl.$^5$ .................. H04B 10/04; H04J 14/00
[52] U.S. Cl. .................. 359/182; 359/181; 359/173; 359/115; 359/188
[58] Field of Search ............... 359/115, 117, 124, 125, 359/123, 126, 154, 173, 181, 182, 188; 455/93, 108

[56] References Cited

U.S. PATENT DOCUMENTS

| | | | |
|---|---|---|---|
| 4,158,478 | 6/1979 | D'Auria et al. | 350/96.23 |
| 4,695,127 | 9/1987 | Ohlhaber et al. | 350/96.23 |
| 4,722,081 | 1/1988 | Fujito et al. | 359/194 |
| 4,726,644 | 2/1988 | Mathis | 359/115 |

*Primary Examiner*—Richard E. Chilcot, Jr.
*Assistant Examiner*—Rafael Bacares
*Attorney, Agent, or Firm*—Glenn W. Bowen; Mark T. Starr

[57] ABSTRACT

A logarithmic video detector/r.f. limiter amplifier provides an amplitude-limited r.f. carrier version of an input signal. The amplitude-limited signal is either employed directly or is coupled to a mixer that produces a down-converted constant-amplitude signal which is applied to a first optical modulator which in turn is coupled to an optical source. The optical modulator is coupled to an optical fiber that carries the frequency component of the input signal at a first light wavelength. The amplifier also supplies a signal which is dependent upon its logarithmic detector response that represents the amplitude component of the input signal. This signal is supplied to a VCO which drives a second optical modulator which is coupled to a second optical source and produces an optical signal of a second light wavelength. In a first embodiment, both optical signals are supplied to the receiver over the same optical fiber link. In a second embodiment the signals that contain frequency and amplitude information are each coupled over a separate optical fiber to the receiver. In a third embodiment, the signal that contains frequency information is coupled over an optical fiber while the signal that contains amplitude information is coupled as an electrical signal to the receiver.

16 Claims, 4 Drawing Sheets

WIDE DYNAMIC RANGE HIGH FREQUENCY SIGNAL TRANSMISSION UTILIZING A LOGARITHMIC AMPLIFIER

BACKGROUND OF THE INVENTION

The present invention relates to the transmission of radio frequency signals which have high frequency and wide bandwidth requirements and transmission of optical information over fiber optic data links with a transmitter that utilizes a logarithmic video detector/limiter amplifier.

Optical data signals have been sent over fiber optics by directly modulating a laser diode with a signal from an electrical signal source. Directly modulating the laser diode with a signal source results in a limited bandwidth due to parasitic conductance and capacitance effects. These effects are caused by frequency changes that occur due to rapid variation in the current in the laser diode.

Distributed feedback lasers have been recently developed which reduce such frequency changes, but the dynamic range limitation of conventional lasers that are amplitude modulated is typically limited to 30 to 50 dB due to the harmonic distortion that is produced in the laser which is an inherent limitation of direct modulation.

Optical modulation and transmission of r.f. signals with a large high frequency range and a large bandwidth are provided by the present invention in which the electrical information-bearing signal is supplied to a logarithmic video detector/radio frequency (r.f.) limiting amplifier, which supplies an amplitude-limited carrier output and a second output that is a result of the logarithmic gain response of the amplifier.

Logarithmic video detector/r.f. limiting amplifiers can provide two output signals, one of which is a constant amplitude carrier signal version of the input signal and the other of which has an amplitude that is logarithmically proportional to the amplitude envelope of the input signal. These two signals may each be processed in different manners such that one signal may be converted to an optically modulated signal and the other may remain an electrical signal. Transmission of both types of signals over a common cable may be desirable. Such cables are known.

U.S. Pat. No. 4,158,478 discloses a combined optical/electrical cable which requires a central conductor, a surrounding shield and a plurality of fibers embedded in the dielectric around the central conductor.

U.S. Pat. No. 4,695,127 shows a combined optical/electrical conductor in which a single electrical conductor and a single optical fiber is loosely wound about the central conductor (see column 3 lines 16-34) which would be more cost effective for the above-noted application. However, this cable requires some form of an additional spacer which complicates the structure of the cable and requires additional components even in the simplest configuration, as shown in the patent, in which a space is spirally wound about the central conductor and an additional buffer tube is required inside the shield.

SUMMARY OF THE INVENTION

A logarithmic video detector/r.f. limiting amplifier is utilized to convert radio frequency (r.f.) carrier, amplitude modulated input signals into output optical signals that are coupled to a receiver over a communication channel that includes at least one optical fiber link. The amplifier produces a first output signal which is a DC output signal that has an amplitude that is logarithmically proportional to the amplitude of the input signal and a second output signal which is an amplitude limited r.f. carrier signal version of the input signal.

The first 20 GHz portion of the spectrum of the amplitude-limited signals from the amplifier does not require a mixer. If the desired spectrum coverage is, for example, from 0.1 GHz to 100 GHz, this may be broken up into 20 GHz segments as follows:

0.1 GHz to 20 GHz—no mixer used,
20 to 40 GHz—mixer downconversion to 0 to 20 GHz,
40 to 60 GHz—mixer downconversion to 0.1 to 20 GHz,
60 to 80 GHz—mixer downconversion to 0.1 to 20 GHz, and
80 to 100 GHz—mixer downconversion to 0.1 to 20 GHz.

When an r.f. mixer is used, it receives the latter output signal and the output of a local oscillator and mixes these two waveforms to produce a down-converted, lower frequency version of the input signal which is supplied to a first optical modulator as a modulation signal. Without the mixer amplitude-limited signals from the amplifier are applied directly to the optical modulator.

The first optical modulator is coupled to a first optical source, such as a laser, and produces a first optical signal that is transmitted over the optical link at a first optical frequency. The first output signal from the amplifier is coupled to a voltage-controlled-oscillator (VCO) which produces an output signal that has a frequency that varies from the nominal frequency of the VCO as a function of the first output signal. The output of the voltage-controlled oscillator is then transmitted over the communication channel at a second frequency.

The output signal from the VCO may be transmitted as an electrical signal or it may be used to modulate a second optical modulator which is coupled to a second optical source, such as a laser, to produce a second optical signal that is transmitted at a second optical frequency. When two optical signals are provided, they may be coupled over separate optical fiber links, or they may be multiplexed into a single optical fiber link.

When the output signal from the VCO is transmitted as an electrical signal, a special optical-electrical coaxial cable is utilizable to transmit both the optical and the electrical signals. The cable is constructed by winding the optical fiber link about the central electrical conductor of the coaxial cable in a spiral fashion. A cladding layer is preferably provided on the wound optical fiber which contacts the inner surface of the coaxial cable shield and centers the central conductor. No additional spacing components are required with this cable, although dielectric fill material for the voids between the central conductor, the optical fiber and the shield may be desired.

DETAILED DESCRIPTION OF THE INVENTION

Figure 1:
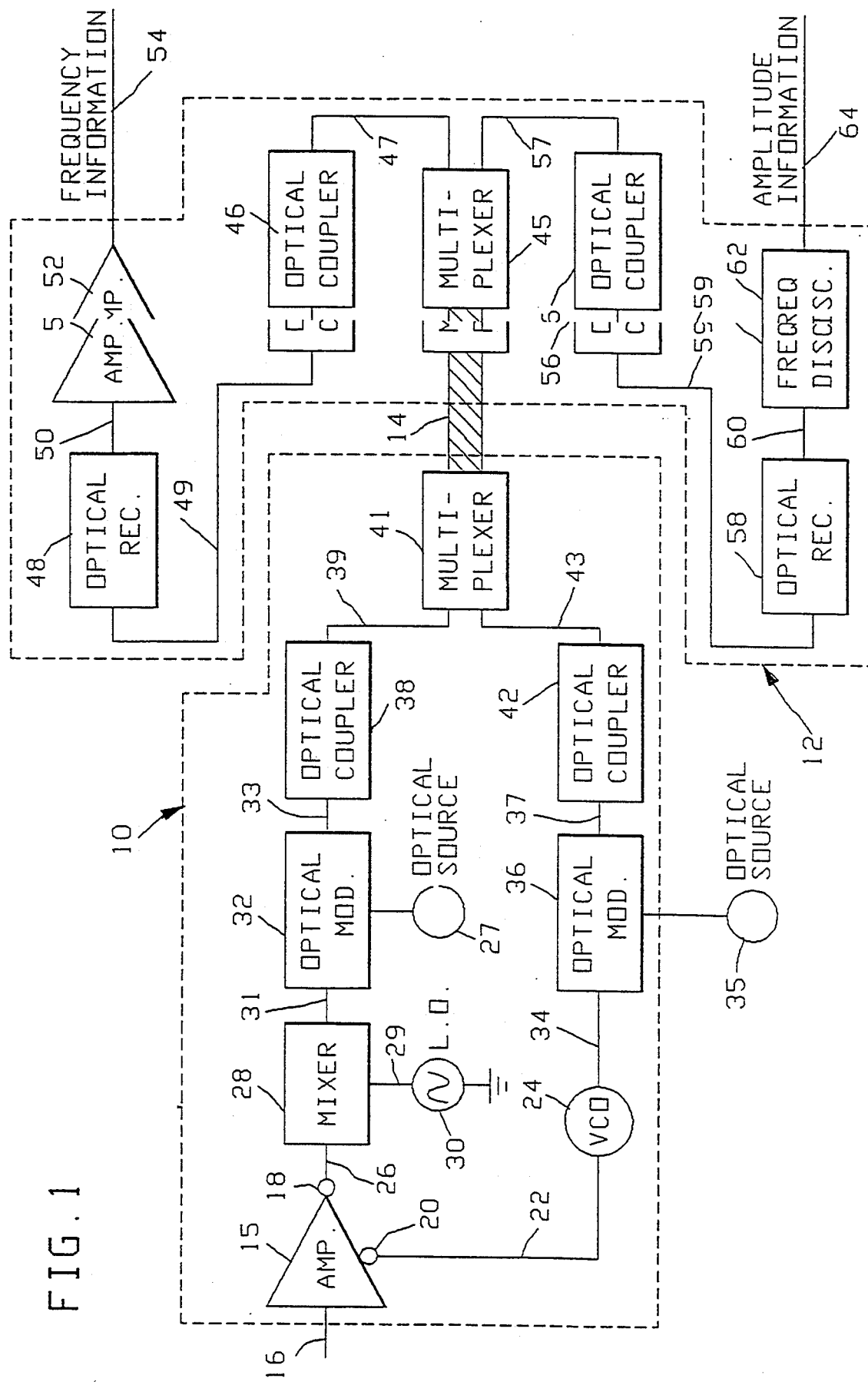
FIG. 1 is a block diagram which illustrates an embodiment of the present invention in which a single optical fiber is used to transmit both the amplitude and frequency components of the output signal.

The transmission of modulated signals over communications channels which have frequencies of 20 GHz and above without the employment of complex and costly transmitter designs is a challenging problem. The present invention provides for relatively inexpensive and yet effective optical modulated signal transmission for the 0.1 to 100 GHz frequency range, and even above this range. Furthermore, typical optical fiber links have a dynamic range on the order of 50 to 60 dB. This invention overcomes these limitations and provides a system with a dynamic range of 80 dB or more.

A logarithmic video detector/r.f. limiter amplifier is employed in the invention. The input signal to the amplifier is converted by the detector/amplifier to two output signals, one of which is a constant amplitude r.f. signal, and the other of which is an amplitude modulation of the signal. The constant amplitude r.f. carrier signal from the logarithmic video detector/r.f. limiter amplifier is either applied to an r.f. mixer, which is also coupled to a local oscillator which has a frequency lower than the lowest frequency that the carrier reaches for signals above 20 GHz or is used directly if the input signals are below 20 GHz (as indicated by the dotted line 26' in FIG. 1). The output of the r.f. mixer is a constant amplitude, down-converted lower frequency version of the constant amplitude output of the detector/amplifier. This down-converted constant amplitude signal is then applied to the first optical modulator which supplies an optical signal on an optical fiber which carries the frequency information component at one wavelength of light.

The logarithmic video detector/r.f. limiter amplifier also supplies an amplified output D.C. signal, which is dependent upon the logarithmic detection response of the amplifier and is supplied to a voltage-controlled-oscillator. The VCO preferably has an output frequency range such that its maximum frequency is substantially lower than either the lowest carrier frequency signal that is provided by the amplifier or the frequency of the local oscillator. The output of the VCO drives a second optical modulator which produces optical light signals as a second wavelength which are transmitted to the receiver.

On the receiving end, the constant amplitude r.f. carrier frequency information may be detected by means of conventional photo-detector conversion techniques. The frequency modulated signal from the photo-detector may, for example, be converted to an amplitude signal though a phase-lock detector, a slope detector or through other suitable means to produce an electrical output whose amplitude varies in proportion to the frequency that is supplied to the detector. The electrical signals, which are representative of frequency information and of amplitude information may then be multiplied together in a conventional multiplier circuit to provide an electrical signal with the original r.f. input frequency and amplitude modulation. Polar Frequency Discriminators are a type of device that is commercially available which may be used to reconstruct the original signal from these electrical signals.

A first embodiment of the invention is shown in FIG. 1 which is coupled to supply both optical signals to a receiver 12 over a single optical fiber 14.

A logarithmic video detector/r.f. limiter amplifier 15 is employed which receives an input signal on the line 16 which may have both frequency and amplitude variations. The amplifier provides one output signal that is supplied to a first output terminal 20 which is produced from the logarithmic video detector response of the amplifier and another output signal that is coupled to a second output terminal 18 which is an amplitude—limited r.f. carrier signal version of the input signal.

The amplitude-modulated signal is coupled from the terminal 20 on the line 22 to a voltage-controlled-oscillator (VCO) 24. The output of the VCO is coupled on the line 34 to an optical modulator 36 which is coupled to receive a light beam from an optical source 35, such as a laser, for example, which produces an optical signal of a first wavelength. The output of optical modulator 36 is coupled via optical fibers 37, 43 through a conventional optical coupler 42 and a conventional optical wavelength division multiplexer 41 which couples the first wavelength signal to the optical fiber 14.

The output of the amplitude modulated signal of the logarithmic video detector portion of the amplifier 15 has a typical bandwidth that is a function of the amplitude information of the signal that modulates the r.f. carrier. It has a logarithmic gain response with respect to the input signal amplitude. This bandwidth is typically 30 GHz or less for radar applications, which is one application where the present invention may be used.

The frequency of the VCO in the illustrated embodiment will be preferably less than the lowest frequency signal that will be produced by the r.f. mixer 28 when it is employed. Because of the limited bandwidth and the relatively lower frequency of the signal supplied on the line 22, essentially only amplitude information is utilized to control the VCO 24. In order to provide a frequency signal which varies adequately about the nominal frequency of the VCO, it is desirable to use as high a modulation index as possible for the control signal that is supplied on the line 22. This will improve the carrier-to-noise ratio of the VCO which will in turn improve the signal-to-noise ratio of the output signal from the VCO on the line 26.

In operation the constant amplitude r.f. signal on the line 26 is either directly supplied to the optical modulator 32 when the signal from the amplifier on the line 26 is in the 0 to 20 GHz range, or is supplied through the mixer 28 when the signal is above 20 GHz. When the mixer 28 is used, the signal on the line 26 is mixed with the output from the local oscillator 30 on the line 29. In a representative example, the frequency range of the r.f. amplitude-limited signal from the amplifier 15 may be from 22 to 40 GHz on the line 26, and the local oscillator 30 may be at a frequency of 20 GHz. Thus, the output of the mixer 28 will typically be an electrical signal in the range from 2 to 20 GHz. Typical optical modulators have a bandwidth on the order of 20 GHz. Thus, if the output from terminal 18 of the amplifier 15 were to be directly supplied to the optical modulator, which is coupled to a second optical source 27, the upper frequency of the signal would be limited by the inherent characteristics of the optical modulator 32.

Signal translation in the embodiment of FIG. 1 is accomplished by the optical modulators 32 and 36 which are preferably external Mach-Zehnder interferometer-types of intensity modulators. The signals through the optical couplers 38 and 42 are supplied to the optical fiber link 14 through a 2-to-1 wavelength division multiplexer 41. Since the light signals that are supplied to the optical fiber link 14 are of greatly different wavelengths, they will be transmitted to the receiver 12 independently without any appreciable crosstalk. Furthermore, since no amplitude information is provided to the optical fiber link 14, it is not subject to dynamic range requirements.

A second 2-1 optical wavelength division multiplexer is used in the receiver 12 to allow for the separation of the two wavelength signals. These two wavelengths may then be converted from optical signals to electrical signals by suitable conventional photo-detectors or other known optical-to-electrical conversion devices.

The optical signal derived from the constant-amplitude r.f. frequency signal is recovered from the output of the multiplexer 45 and is sent through an optical coupler 46 to the optical receiver 48 via the optical fiber lines 47, 49. The receiver 48 may use a photo-detector (not shown) to typically convert the optical signal to a 2-to-20 GHz amplitude-limited electrical signal. This electrical signal is then supplied on the line 50 to an r.f. amplifier 52 which supplies its output signal on the line 54. The output signal on the line 54 conveys the frequency information of the original input signal on the line 16.

The optical signal is derived from the amplified signal through an optical coupler 56 and is recovered from the multiplexer 45 and is sent to another optical receiver 58 via the lines 57, 59. The receiver 58 provides an output signal over the line 60 that represents amplitude information to a frequency discriminator 62 which may be, for example, a phase-lock detector, a slope-detector or other suitable conventional frequency discriminating device. The output signal from the frequency discriminator 62 provides the electrical output signal on the line 64 that contains the amplitude information of the original input signal to the line 16.

One commercially available device that may be used as a high frequency discriminator is called a Polar Frequency Discriminator which is available from Narada Microwave Corporation of Plainview, Long Island, N.Y. A Polar Frequency Discriminator consists of a power divider which, in combination with a delay line, provides a phase shift that varies linearly with frequency, a correlator which compares the amplitude and phase of two coherent signals and provides for analog outputs that are functions of the signals, and four matched square-law detectors which provide the output of the device. The construction and operation of such devices are described in "Narada Probe" January 1975, Vol. 7, No. 1, a Quarterly Technical Journal Copyright, 1975, The Narada Microwave Corporation, Plainview, Long Island, N.Y. 11803, "Polar Frequency Discriminators," pages 1-3.

By use of this device, or other known devices, the output signal on the line 16 may be replicated from the signals appearing on the lines 50, 60.

Figure 2:
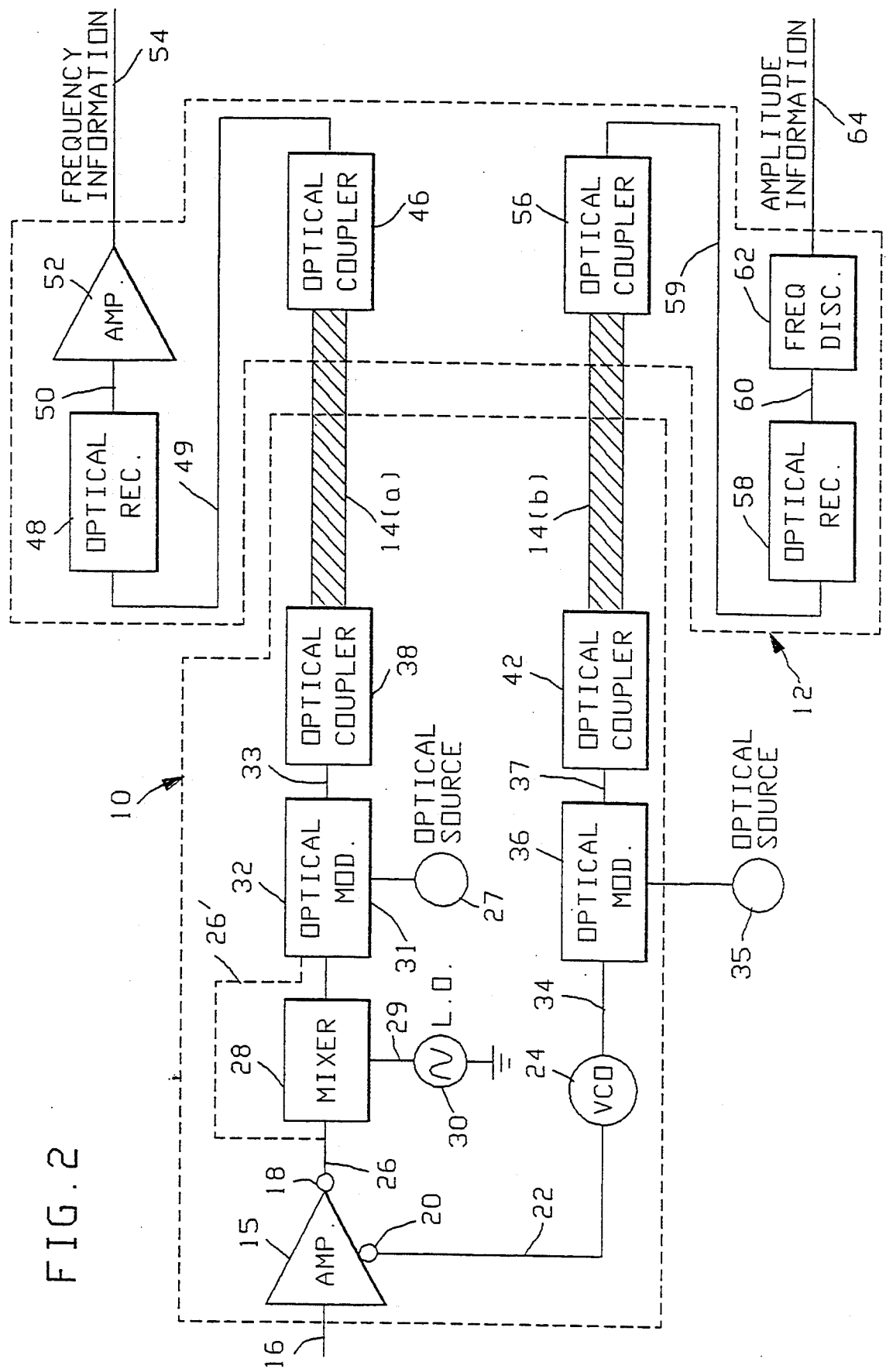
FIG. 2 is a partial block diagram of an embodiment in which transmission of the frequency component signal and the amplitude component of the output signal are transmitted over two separate optical fibers.

FIG. 2 shows an alternate embodiment of the invention in which all of the components are identical to those of FIG. 1, except that two separate optical fiber link interconnects 14(a) and 14(b) are employed between the optical couplers 38, 46 and 42, 56, respectively, and the multiplexers 41 and 45 are not employed since they are not necessary. Otherwise, all of the elements of the embodiment of FIG. 2 have the same element numbers applied to them as those of FIG. 1 and the operation of the two embodiments is otherwise identical.

A third embodiment of the invention is depicted in FIG. 3 which again employs many of the same components that are utilized in FIGS. 1 and 2. To the extent that common elements are employed, the same element numbers that are applied in FIGS. 1 and 2 are used. As in the embodiment of FIG. 2, the constant amplitude frequency information signal is separated from the amplitude information signal supplied over the optical fiber 14(a) through the optical receiver 48 which is coupled to the r.f. amplifier 52.

Figure 3:
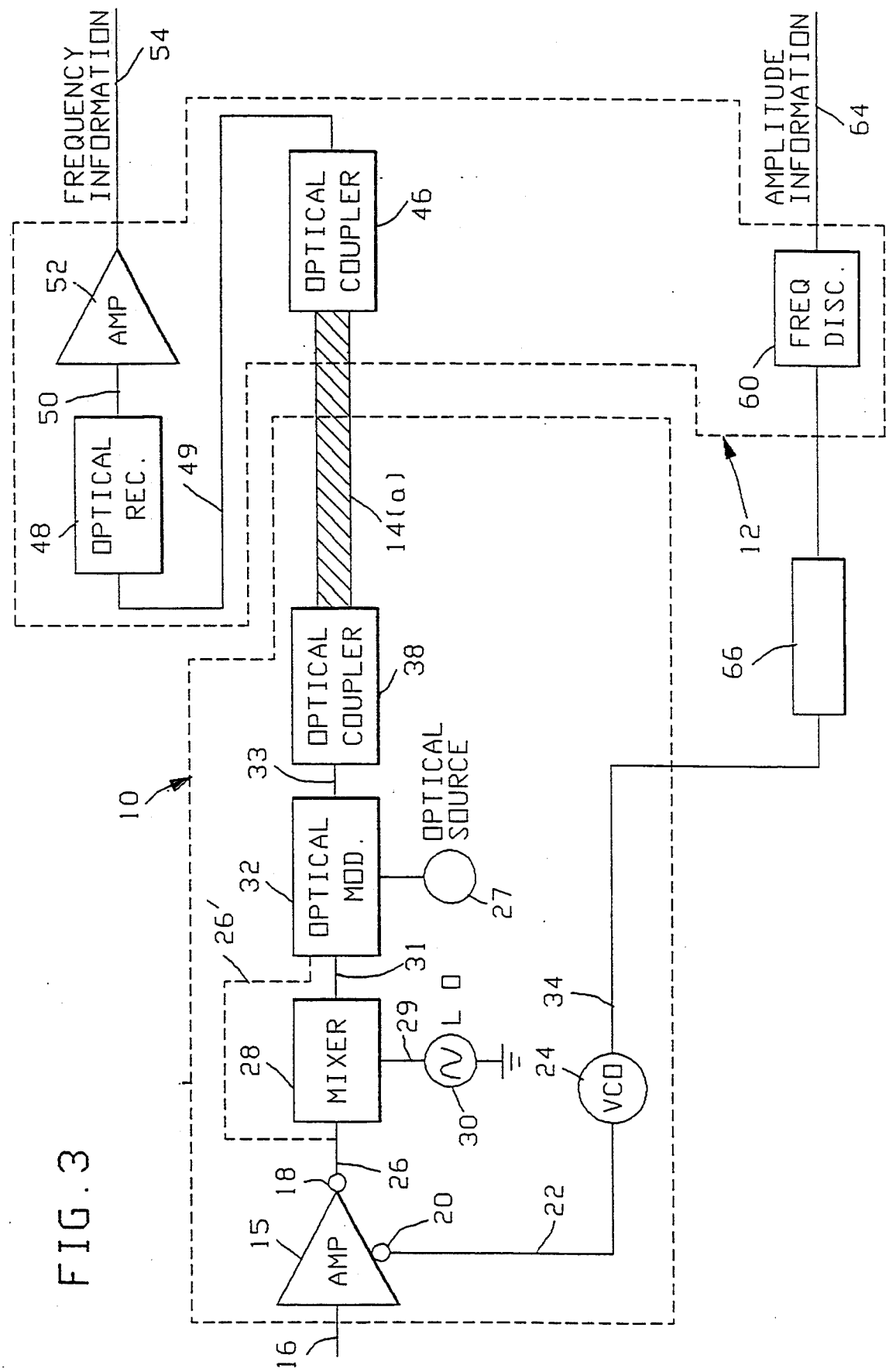
FIG. 3 is a block diagram of an embodiment in which an optical fiber carries the frequency component and an electrical conductor carries the amplitude component.

In the embodiment of FIG. 3, however, the electrical signal from the VCO that appears on the optical fiber line 34 is not converted into an optical signal, but is instead coupled directly over an electrical conductor 66 to the frequency discriminator 60.

Figure 4:
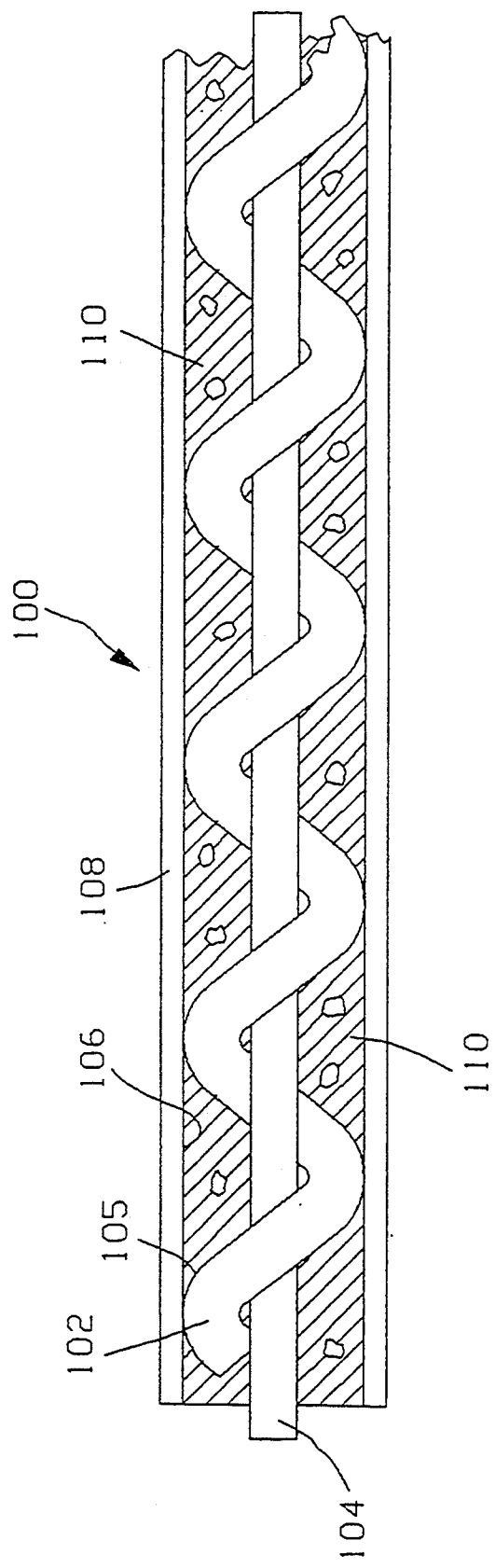
FIG. 4 is a cut-away side view of a coaxial cable that includes an optical fiber and a central electrical conductor and may be used with the embodiment of FIG. 3.

FIG. 4 shows a high frequency interconnect cable which can be utilized in conjunction with the embodiment of FIG. 3. The cable is constructed to provide electrical coaxial cable properties for conduction of the electrical signal and an optical fiber which is wound around the center conductor of the coaxial cable to provide for optical signal transmission. Advantages of coaxial cable are that it is relatively immune to external electrical field induced noise and it propagates high frequency information for long distances with low losses.

In the combined coaxial electrical and fiber optic cable 100 shown in FIG. 4, a cylindrical optical fiber 102 (equivalent to optical fiber 14(a) of FIG. 3) is wound around a central electrical conductor rod 104 (equivalent to electrical conductor 66 of FIG. 3). The optical fiber 102 preferably has a protective outer sheath or a cladding layer 105 that engages the inner surface 106 of shield 108 of the cable. Such sheaths or cladding layers are well known in the art. Thus, the optical fiber 102 can provide both dielectric properties and support properties since optical fiber quartz or glass materials also serve as electrical dielectric materials. Although quartz or glass are excellent dielectric materials suitable for use in insulators or coaxial cables, their costs are normally excessive. However, when glass or quartz material is utilized to form an optical fiber, as shown in FIG. 4, which provides both for optical transmission and electrical insulation, the additional functionality and the relative low weight and low volume of the structure can offset material cost considerations.

The optical fiber 102 of FIG. 4 preferably has a low pitch of a few turns per inch, and is tightly spirally wound around the electrical central conductor 104. This configuration will allow for the cable to bend and conform to various mounting surfaces. Additionally, this spirally wound fiber can change its length to some extent to compensate for temperature effects and bending. The coupling of the electrical output of the central conductor 104 and the optical output of the optical fiber 102 may be achieved by methods well known to those skilled in the art. Additional known dielectric materials may be used to fill the space between the optical fibers 102, the central conductor 104 and the shield 108.

While various particular forms of the invention have been illustrated and described, it will be apparent that various modifications can be made without departing from the spirit and scope of the invention. Accordingly, it is not intended that the invention be limited, except as by the appended claims.

What is claimed is:

1. A signal transmission system constructed to convert amplitude-modulated radio frequency (r.f.) carrier input signals into two different wavelength output signals that are transmitted to a receiver means via a signal coupling means, wherein said signal coupling means comprises said first and second signal transmission means coupled to said receiving means, each of which supplies one of said wavelength output signals to said receiving means, comprising (a) signal translation means comprising at least a first optical source and modulation means coupled to supply an optical signal of a first wavelength to said first signal transmission means, and signal providing means for providing an amplitude information signal of a second wavelength to said second signal transmission means, (b) amplifier means coupled to receive said input signal and is constructed to produce a first output signal which has an amplitude that is logarithmically proportional to the amplitude of said input signal and a second output signal which is an amplitude-limited r.f. carrier signal version of said input signal, (c) signal path means coupled between said amplifier means to receive said second output signal, and said first optical source and modulation means for modulating said first optical source and modulation means so as to enable said first optical source and modulation means to supply said output signal of said first wavelength, (d) voltage-controlled-oscillator means having a control input coupled to said amplifier means to receive said first optical signal constructed to supply a VCO output signal that is a function of said first output signal to said signal providing means to enable said signal providing means to provide said output signal of said second wavelength.

2. A signal transmission system as claimed in claim 1 wherein said signal providing means comprises a second optical source and modulation means coupled to said voltage-controlled-oscillator means to receive said VCO output signal as a modulating signal, and coupled to said second transmission means to supply an optical signal that represents said amplitude information signal.

3. A signal transmission system as claimed in claim 2 wherein said signal coupling means comprises multiplexing means coupled to said first and second signal transmission means for receiving said first and second wavelength signals, and further comprising a single optical fiber means coupled to said multiplexing means for coupling said first and second wavelength signals to said receiving means simultaneously.

4. A signal transmission means as claimed in claim 2 wherein said signal coupling means comprises a first optical fiber means coupled to said first signal transmission means and a second optical fiber means coupled to said second signal transmission means.

5. A signal transmission system as claimed in claim 1 wherein said signal providing means comprises an electrically conductive path means that couples said VCO output signal to said second signal transmission means and said second signal transmission means comprises an electrical signal path.

6. A signal transmission means as claimed in claim 5 wherein said electrically conductive path means comprises a coaxial cable means that is electrically coupled to said second signal transmission means, and comprises a cylindrical rod, central conductor and the surrounding conductive shield, and said signal coupling means comprises an optical fiber means that is optically coupled to said first signal transmission means, wherein said coaxial means is constructed such that optical fiber means is spirally wound around said central conductor and is enclosed by said shield.

7. A signal transmission system as claimed in claim 6 wherein additional dielectric material fills the space between said cylindrical rod, central conductor, said optical fibers and said shield.

8. A signal transmission system as claimed in claim 1 wherein said signal path means comprises a local oscillation means for generating an r.f. electrical local oscillator signal and r.f. mixing means having a first input coupled to said amplifier means to receive said input signal and a second input coupled to receive said r.f. electrical local oscillator signal and an output coupled to said first optical source and modulation means, said r.f. mixing means being constructed so as to mix said second output signal and said r.f. electrical local oscillator signal and to provide an electrical modulation output signal to said first optical source and modulation means.

9. A signal transmission system as claimed in claim 8 wherein said signal providing means comprises a second optical source and modulation means coupled to said voltage-controlled-oscillator means to receive said VCO output signal as a modulating signal, and coupled to said second transmission means to supply an optical signal that represents said amplitude information signal.

10. A signal transmission system as claimed in claim 9 wherein said signal coupling means comprises multiplexing means coupled to said first and second signal transmission means for receiving said first and second wavelength signals, and further comprising a single optical fiber means coupled to said multiplexing means for coupling said first and second wavelength signals to said receiving means simultaneously.

11. A signal transmission means as claimed in claim 9 wherein said signal coupling means comprises a first optical fiber means coupled to said first signal transmission means and a second optical fiber means coupled to said second signal transmission means.

12. A signal transmission system as claimed in claim 8 wherein said signal providing means comprises an electrically conductive path means that couples said VCO output signal to said second signal transmission means and said second signal transmission means comprises an electrical signal path.

13. A signal transmission means as claimed in claim 12 wherein said electrically conductive path means comprises a coaxial cable means that is electrically coupled to said second signal transmission means, and comprises a cylindrical rod, central conductor and the surrounding conductive shield, and said signal coupling means comprises an optical fiber means that is optically coupled to said first signal transmission means, wherein said coaxial means is constructed such that optical fiber means is spirally wound around said central conductor and is enclosed by said shield.

14. A signal transmission signal as claimed in claim 13 wherein additional dielectric material fills the space between said cylindrical rod, central conductor, said optical fibers and said shield.

15. A signal transmission system constructed to convert amplitude-modulated radio frequency (r.f.) carrier input signals into two different wavelength output signals that are transmitted to a receiver means via a signal coupling means, wherein said signal coupling means comprises first and second signal transmission means coupled to said receiving means, each of which supplies one of said wavelength output signals to said receiving means comprising signal conversion means which is coupled to receive said input signals and is coupled to said first and second signal transmission means and is constructed to produce a first output signal which has a wavelength that is different than the wavelength of said input signal and is an amplitude-limited r.f. carrier signal version of said input signal, and to produce a second output signal which is of a wavelength which is different than the wavelength of said first output signal and which has an amplitude that is logarithmically proportional to the amplitude of said input signal wherein said first output signal is coupled to said first signal transmission means and said second output signal is coupled to said second signal transmission means.

16. A signal transmission system as claimed in claim 15 comprising multiplexing means coupled to said first and second signal transmission means for simultaneously coupling said first and second output signals to said receiving means.

\* \* \* \* \*